T. WEISS.
PIPE-COUPLING.

No. 188,213. Patented March 6, 1877.

Witnesses
Saml. J. Van Stavoren
Jos. B. Connolly

Inventor
Thos. Weiss,
By Connolly Bros., Attorneys

UNITED STATES PATENT OFFICE.

THOMAS WEISS, OF BETHLEHEM, PENNSYLVANIA.

IMPROVEMENT IN PIPE-COUPLINGS.

Specification forming part of Letters Patent No. 188,213, dated March 6, 1877; application filed February 2, 1877.

*To all whom it may concern:*

Be it known that I, THOMAS WEISS, of Bethlehem, in the county of Northampton and State of Pennsylvania, have invented certain new and useful Improvements in Pipe-Couplings; and I do hereby declare the following to be a full, clear, and exact description of the invention, such as will enable others skilled in the art to which it pertains to make and use it, reference being had to the accompanying drawings, which form part of this specification, in which—

Figure 1:
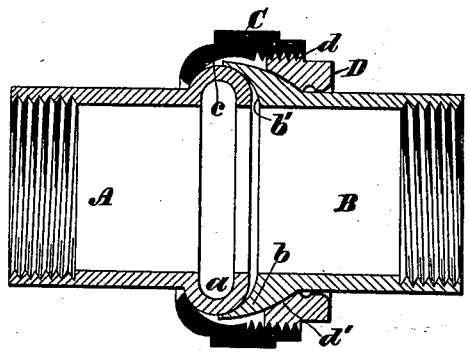
Figure 2:
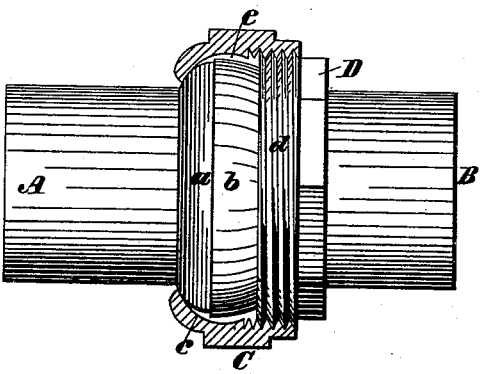
Figure 3:
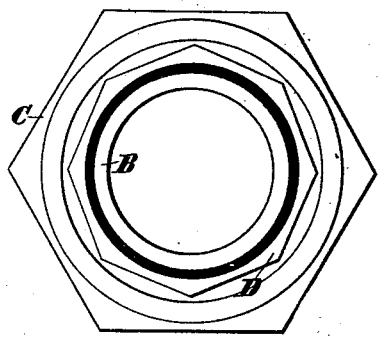

Figure 1 is a longitudinal section. Fig. 2 is a side elevation; Fig. 3, an end view.

My invention has for its object to provide a perfectly tight joint for steam and other pipes.

My improvements consist in the peculiar construction and combination of parts hereinafter more fully described, having reference particularly to the adaptation of the "ball-and-socket" principle to the purpose in view.

In carrying these improvements into effect, I form one of the pipes to be joined with a convex or rounded flange, and the other pipe with a concave seat or recess to receive such flange. The meeting ends of these two pipes fit within a ring or union, which is rounded internally to form a concave seat for the flange on the pipe. A nut, having an external thread, surrounds one of the pipes and screws into the union or ring, holding the meeting ends of the two pipes together.

Referring to the accompanying drawing, A designates a steam or other pipe, having a convex or rounded flange or head, $a$, which is a substitute for the square-shouldered flat-faced flange usually employed. B represents another pipe, having an enlarged end or flange, $b$, which is rounded or hollowed out, as shown at $b'$, to form a socket or concave seat for the convex flange or head $a$. The flanged meeting ends of these two pipes come together, as shown, inside a ring or union, C, which has a concave seat, $c$, for the flange $a$, or for the flange $b$, as the position of the pipes may be reversed within the union. D is a nut, screwing into the union C, being threaded at $d$ and made concave at $d'$, to cause it to fit snugly to the flange $a$ or $b$, against which it presses. The object of said nut is to cause the meeting ends of the pipes A and B to press tightly against one another.

It will be observed that an annular space, indicated by the letter $e$, is left between the union and the flanged ends of the pipes. This gives play to said pipes and permits a perfectly tight joint to be formed, even when they are bent somewhat out of line.

The advantage of this coupling over the common device is that a perfect joint cannot be made with the latter when the pipes are at all out of line, as it has two straight surfaces, which will not fit unless the pipes are exactly straight. Again, if the two faces of the common coupling do not meet evenly all around the edge of one will naturally strike first and cut the intervening gum washer. The joint will then leak.

With my improved coupling there is no danger of cutting the washer, as there are no flat surfaces and no edges, as in the common device. So, too, owing to the ball-and-socket or convex-concavo character of the ends of the pipes, and the seat afforded them in the union, said pipes have considerable play, and will have sufficient surface contact at their meeting ends even when bent to some extent out of line, such bending being naturally incident to the expansion of a long line of steam-pipe.

It will be observed that neither of the pipes A or B is screwed into the union, both being smooth or plain externally. This gives play to each of said pipes, and allows both of them to be adjusted or bent out of line in the union, while permitting a perfectly tight joint to be effected therein.

In the common device above referred to one of said pipes is externally threaded, and, when screwed into the union, becomes perfectly fast therein or homogeneous therewith, so that no lateral adjustment whatever of said screwed pipe in the union is possible.

With my improvements, however, this screwing of either pipe into the union is dispensed with. Each of the pipes has a certain freedom of lateral movement therein, both, however, being held firmly together by means of the nut D.

What I claim as my invention is—

1. The pipes A and B, having convex-concavo flanges or meeting ends $a$ $b$, in combination with the ring or coupling C, having a concave seat, $c$, and the ring or collar D, to which the ring C is attached, substantially as shown and described.

2. In combination with the correspondingly-flanged pipes A B, the internally-threaded union C, and externally-threaded ring or collar D, substantially as described.

3. The combination of pipes A and B with union C, an annular space, $e$, being formed between the pipes and the union, to give play to the former, substantially as shown and described.

4. In combination with a union, C, the pipes A and B, made smooth or plain externally, to permit play in said union, and held in place therein by a nut, D, substantially as shown and described.

In testimony that I claim the foregoing I have hereunto set my hand this 29th day of January, 1877.

THOS. WEISS.

Witnesses:
AMANDUS SALGER,
M. DANL. CONNOLLY.